(12) United States Patent
Weaver et al.

(10) Patent No.: US 12,519,330 B2
(45) Date of Patent: Jan. 6, 2026

(54) CONNECTOR SYSTEM WITH CONTOURED CONTACTS

(71) Applicant: TE Connectivity Solutions GmbH, Schaffhausen (CH)

(72) Inventors: Brian Keith Weaver, Middletown, PA (US); Andrew B. Fortier, Middletown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 672 days.

(21) Appl. No.: 17/937,469

(22) Filed: Oct. 3, 2022

(65) Prior Publication Data
US 2024/0113536 A1 Apr. 4, 2024

(51) Int. Cl.
*H02J 7/00* (2006.01)

(52) U.S. Cl.
CPC ................................. *H02J 7/0044* (2013.01)

(58) Field of Classification Search
CPC .. H02J 7/0044; H02J 7/0045; H01R 13/2428; H01R 13/02; H01R 13/2478; H01R 4/2437
USPC .......................................... 320/113, 115, 107
See application file for complete search history.

(56) References Cited

U.S. PATENT DOCUMENTS

| | | | | |
|---|---|---|---|---|
| 6,099,363 | A * | 8/2000 | Shirai | H01R 4/5075 439/863 |
| 6,386,730 | B1 * | 5/2002 | Matthews | F21L 4/085 362/183 |
| 6,551,150 | B2 * | 4/2003 | Machado | H01R 4/023 439/876 |
| 7,736,199 | B2 * | 6/2010 | Cossette | H01R 13/426 439/745 |
| 9,255,696 | B2 * | 2/2016 | Maglica | F21V 14/045 |
| 11,236,872 | B2 * | 2/2022 | Buhl | F21V 23/06 |
| 11,973,362 | B2 * | 4/2024 | Moubedi | H02J 7/0042 |
| 2001/0006862 | A1 * | 7/2001 | Suzuki | H01R 13/432 439/752.5 |
| 2006/0120069 | A1 * | 6/2006 | West | H02J 7/0029 362/157 |

(Continued)

FOREIGN PATENT DOCUMENTS

| | | | | |
|---|---|---|---|---|
| CN | 108140988 | A * | 6/2018 | ............. H01R 24/84 |
| DE | 202016103327 | U1 * | 8/2016 | ............ H02J 7/0044 |

(Continued)

*Primary Examiner* — Jared Fureman

(57) ABSTRACT

A contact system for electrically connecting a device having an arcuate wall with a docking station having a linear wall. The contact system includes a first contact positioned in the device and a second contact positioned in the docking station. The first contact has a contoured contact engagement surface with a contoured contact engagement surface arc which is essentially the same as an arcuate wall arc of the arcuate wall of the device. The second contact has a resilient contact arm which engages the contoured contact engagement surface of the first contact when the device is inserted into the docking station. The engagement of the resilient contact arm of the second contact and the contoured contact engagement surface of the first contact provides a positive electrical connection between the first contact and the second contact and compensates for angular misalignment between the device with the docking station.

18 Claims, 4 Drawing Sheets

(56) References Cited

U.S. PATENT DOCUMENTS

| | | | | |
|---|---|---|---|---|
| 2006/0232239 A1* | 10/2006 | Maglica | ................ | H02J 7/0045 |
| | | | | 320/107 |
| 2007/0171082 A1* | 7/2007 | Melnik | .................. | F21L 4/005 |
| | | | | 340/574 |
| 2008/0284374 A1* | 11/2008 | Gardner | ................ | H02J 7/0044 |
| | | | | 320/115 |
| 2012/0188753 A1* | 7/2012 | Popper | .................. | H02J 7/0044 |
| | | | | 362/183 |
| 2014/0197781 A1* | 7/2014 | Maglica | ................ | H02J 7/0042 |
| | | | | 320/107 |
| 2018/0292837 A1* | 10/2018 | Chen | ..................... | H02J 7/0042 |

FOREIGN PATENT DOCUMENTS

| | | | | |
|---|---|---|---|---|
| DE | 102016111528 A1 * | 12/2017 | ............ | H02J 7/0044 |
| WO | WO-2008095374 A1 * | 8/2008 | ............. | H01R 43/16 |

* cited by examiner

CONNECTOR SYSTEM WITH CONTOURED CONTACTS

FIELD OF THE INVENTION

The present invention relates to a connector system for transferring power from a planar or linear surface on a docking station to a device with a radial or arcuate shape. In particular, the invention relates to a device with contoured contacts to facilitate mating.

BACKGROUND OF THE INVENTION

Cordless devices are increasingly popular and used by many consumers. In order to supply power to the cordless devices, the cordless devices must be charged in a docking station or the like. With current docking stations, positioning of the cordless device in the docking station is critical to allow the contacts in the docking station to make a proper electrical connection with the terminals in the cordless device. If a proper electrical connection is not made, the cordless device will not charge. The proper positioning may be problematic because users are often careless when positioning the cordless device in the docking stations and because docking stations are often mounted in out of the way locations which may be difficult to access.

It would, therefore, be beneficial to provide a connector system which allows for a proper electrical connection to be made between the contacts in the docking station and the contacts in the cordless device, even if the cordless device is slightly angularly misaligned in the docking station. In particular, it would be beneficial to provide a connector system for transferring power from a planar or linear surface on the docking station to the cordless device with a contoured, arcuate or radial shape, while allowing for some angular misalignment.

SUMMARY OF THE INVENTION

An embodiment is directed to a contact system for electrically connecting a device having an arcuate wall with a docking station having a linear wall. The contact system includes a first contact and a second contact. The first contact is positioned in the device. The first contact has a first contact engagement portion with a contoured contact engagement surface. The contoured contact engagement surface has a contoured contact engagement surface arc which is essentially the same as an arcuate wall arc of the arcuate wall of the device. The second contact is positioned in the docking station. The second contact has a second contact engagement portion with a resilient contact arm. The resilient contact arm of the second contact engages the contoured contact engagement surface of the first contact when the device is inserted into the docking station. The engagement of the resilient contact arm of the second contact and the contoured contact engagement surface of the first contact provides a positive electrical connection between the first contact and the second contact and compensates for angular misalignment between the device with the docking station.

An embodiment is directed to a cordless device which is charged by a docking station. The device has a housing with an arcuate outer wall. An opening is provided in the outer wall and extends through the outer wall to an interior cavity of the housing. A contact is positioned in a pocket in the interior cavity of the housing. The pocket and the contact are positioned in line with the opening. The contact has a contact engagement portion with an arcuate contact engagement surface. The arcuate contact engagement surface has an arcuate contact engagement surface arc which is essentially the same as an outer wall arc of the outer wall of the device. The arcuate contact engagement surface of the contact is positioned in electrical engagement with a docking contact of the docking station as the cordless device is inserted into the docking station. The configuration of the contact allows the contact to compensate for angular misalignment between the device with the docking station.

An embodiment is directed to a cordless device docking system having a cordless device and a docking station. The cordless device has a first housing with an arcuate outer wall. A first opening is provided in the outer wall and extends through the outer wall to an interior cavity of the housing. A first contact is positioned in the interior cavity of the housing in line with the first opening. The first contact has a first contact engagement portion with an arcuate contact engagement surface. The arcuate contact engagement surface has an arcuate contact engagement surface arc which is essentially the same as an outer wall arc of the outer wall of the device. The docking station has a second housing with a device receiving cavity with a linear wall portion. A second opening is provided in the linear wall portion and extends through the linear wall portion. A second contact is positioned in line with the second opening and extends through the second opening. The second contact has a second contact engagement portion having a resilient contact arm. The resilient contact arm of the second contact engages the arcuate contact engagement surface of the first contact when the device is inserted into the docking station. The engagement of the resilient contact arm of the second contact and the arcuate contact engagement surface of the first contact provides a positive electrical connection between the first contact and the second contact and compensates for angular misalignment between the device with the docking station.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
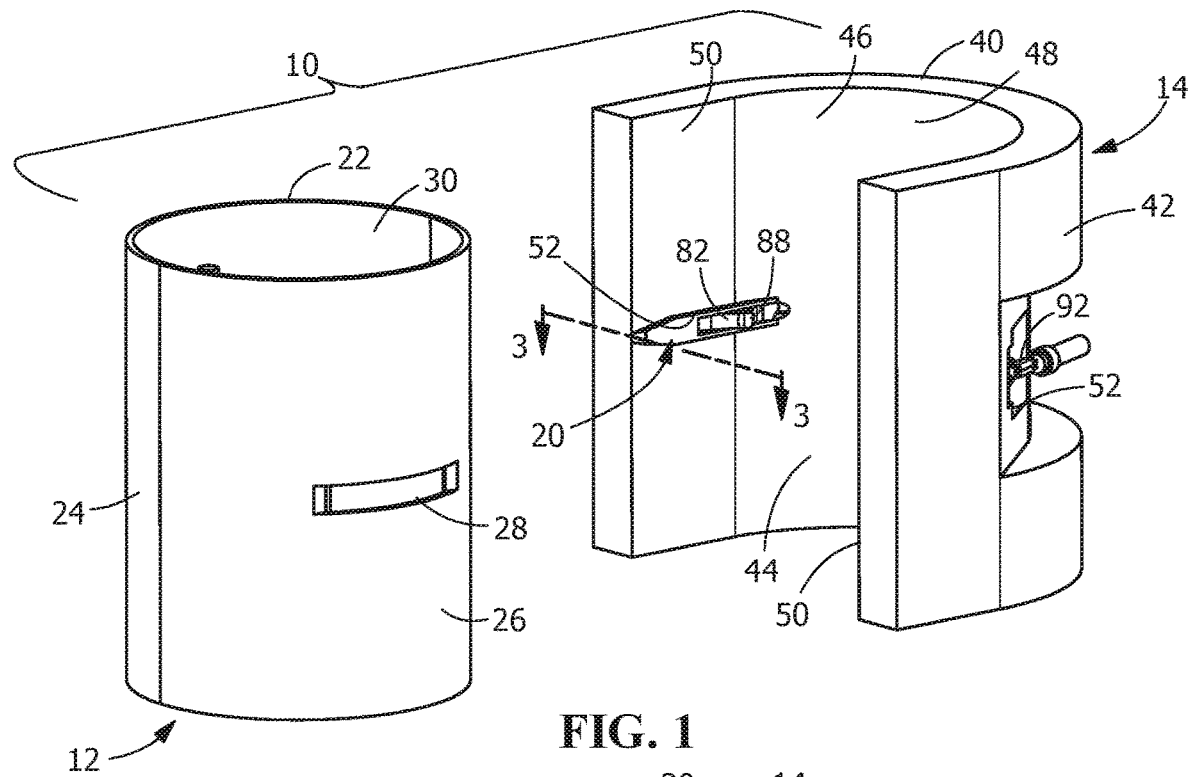
FIG. 1 is a diagrammatic perspective view of a docking station and a cordless device prior to insertion into the docking station.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
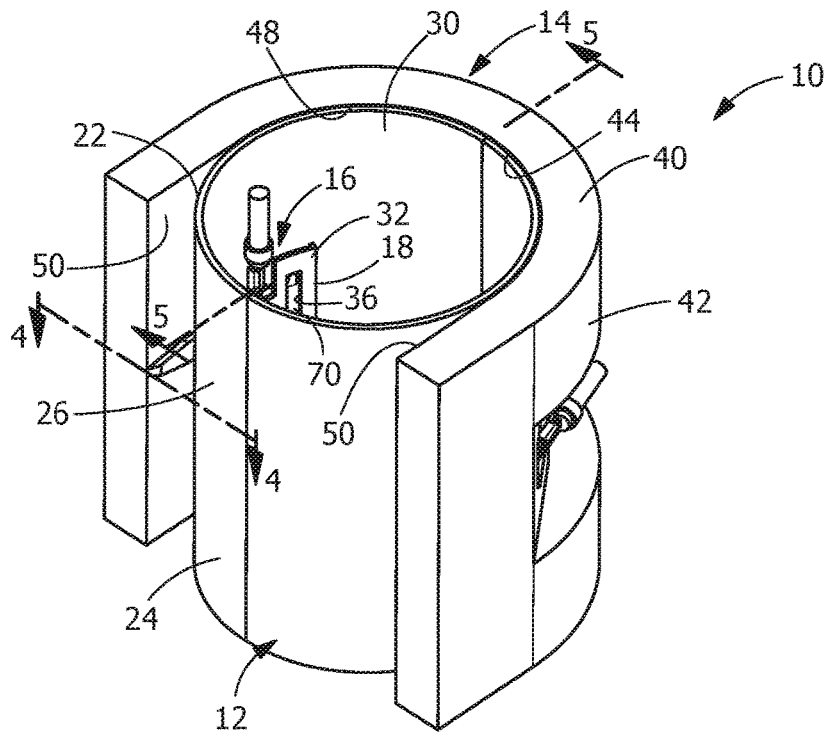
FIG. 2 a diagrammatic perspective view of the cordless device inserted into the docking station.

As shown in FIGS. 1 and 2, a cordless device docking system 10 is shown. The cordless device docking system 10 includes a cordless device 12 and a docking station 14. The cordless device docking system 10 has a contact system 16 which includes first contacts 18 positioned in the cordless device 12 and second contacts 20 positioned in the docking station 14. When the cordless device 12 is positioned in the docking station 14, the first contacts 18 and the second contacts 20 are placed in mechanical and electrical engagement, wherein the docking station 14 through the second contacts 20 supplies power to the cordless device 12 through the first contacts 18 to charge the cordless device 12.

In the illustrative embodiment shown, the cordless device 12 has a housing 22 with a mating portion 24 with an arcuate or radial outer wall 26. Openings 28 are provided in the outer wall 26. In the embodiment shown, the openings 28 are provided on opposite sides of the mating portion 24. The openings 28 extend through the outer wall 26 to an interior cavity 30 of the housing 22.

Figure 4:
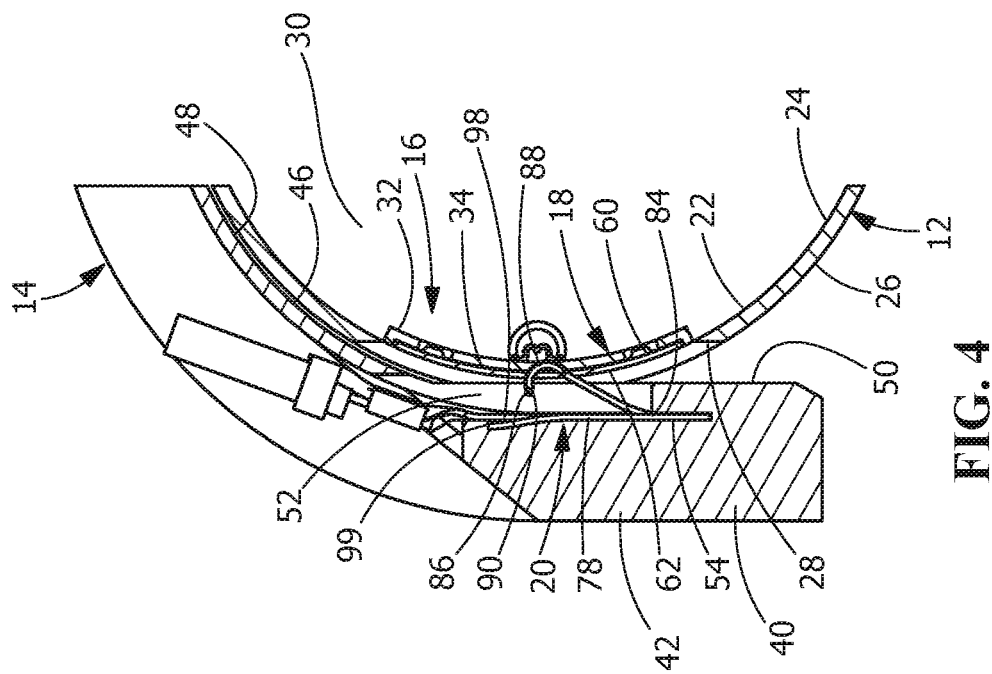
FIG. 4 is cross-sectional view of the cordless device inserted into the docking station, taken along line 4-4 of FIG. 2.
Figure 5:
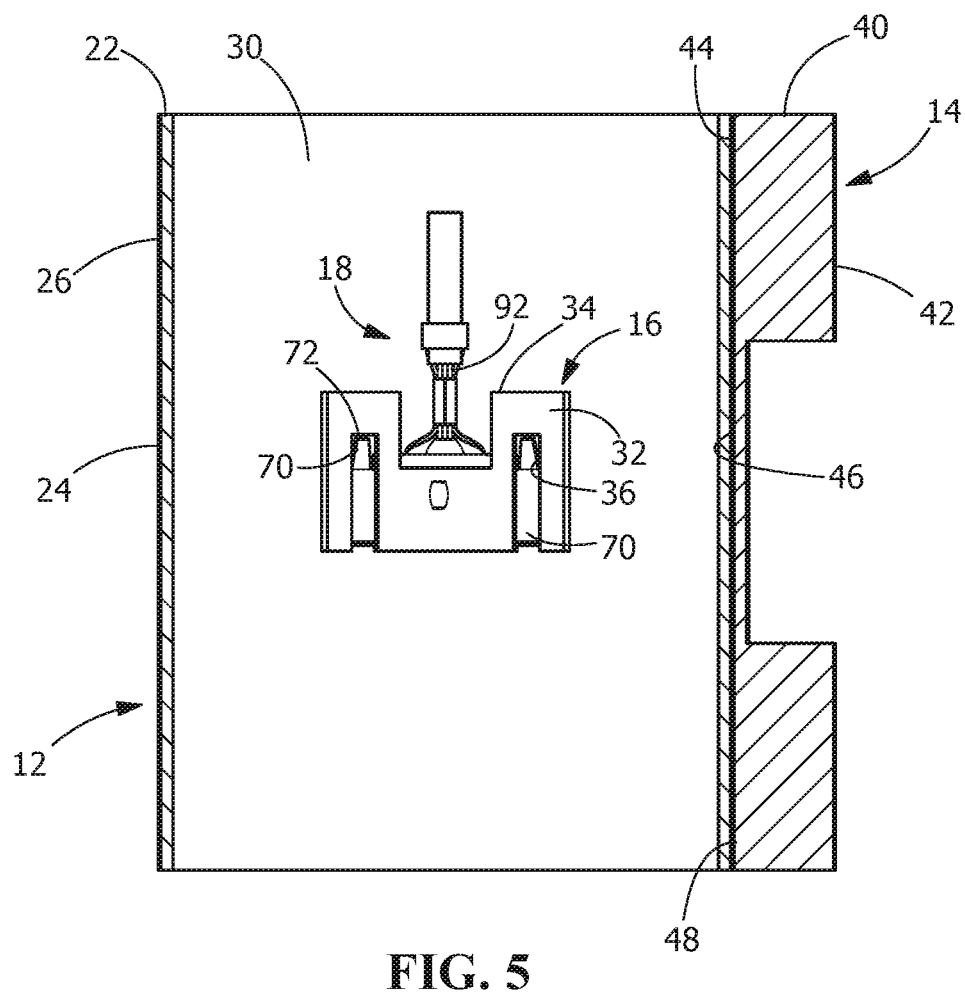
FIG. 5 is a view of a contact receiving pocket in the interior of the cordless device

As shown in FIGS. 4 and 5, contact receiving pockets 32 are provided in the interior cavity 30 in line with the openings 28. The contact receiving pockets 32 have slots 34 for receiving the first contacts 18 therein. The contact receiving pockets 32 have retention openings 36 which extend into the slots 34.

Figure 3:
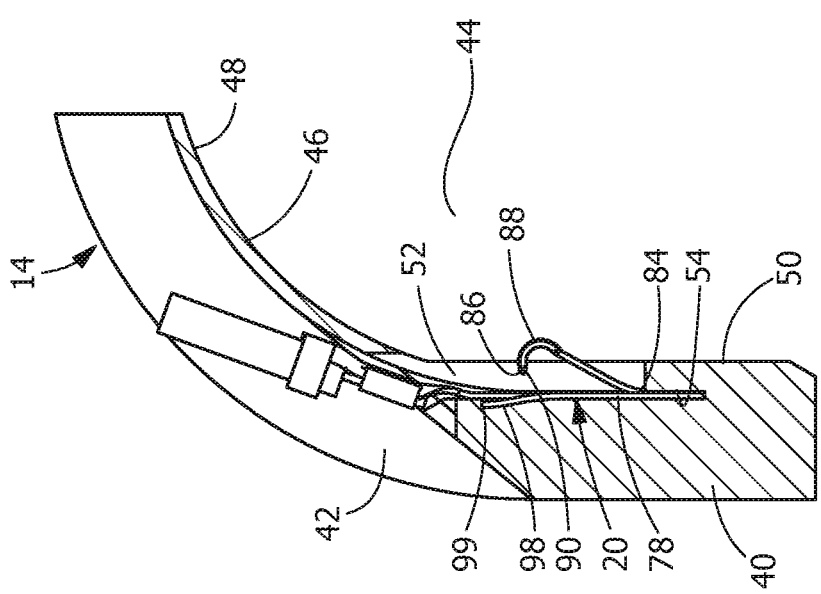
FIG. 3 is cross sectional view of the docking station taken along line 3-3 of FIG. 1.

As shown in FIGS. 1, 3 and 4, the docking station 14 has a housing 40 with a mating portion 42 with a device receiving cavity 44. The device receiving cavity 44 has an interior wall 46 with an arcuate portion 48 and planar or linear wall portions 50. Openings 52 are provided in the planar or linear wall portions 50 of the interior wall 46. In the embodiment shown, the openings 52 are provided on opposite sides of the device receiving cavity 44. The openings 52 extend through the planar or linear wall portions 50 of the interior wall 46.

As shown in FIGS. 3 and 4, contact receiving slots 54 are provided in the housing 40 in line with openings 52. The contact receiving slots 54 are configured to receive the second contact 20 therein.

Figure 6:
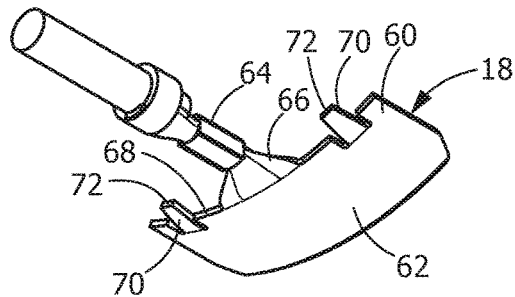
FIG. 6 is a front or contact engagement side perspective view of a contact positioned in the cordless device.
Figure 7:
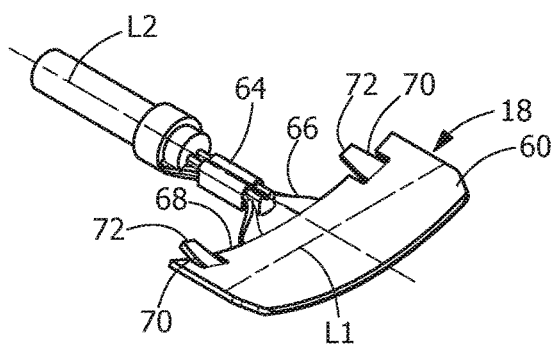
FIG. 7 is a back perspective view of the contact of FIG. 6.

As shown in FIGS. 6 and 7, the first contacts 18 have contact engagement portions 60 with contoured, redial or arcuate contact engagement surfaces 62. The contoured, redial or arcuate contact engagement surfaces 62 have a contoured, redial arcuate contact engagement surface arc which is essentially the same as an arcuate wall arc of the arcuate or radial outer wall 26 of the device 12. As shown in FIG. 7, the contact engagement portions 60 of the first contacts 18 have longitudinal axes L1 which are essentially perpendicular to longitudinal axes L2 of the first contacts 18.

The first contacts 18 have wire receiving portions 64 and transition portions 66 which extend between edges 68 of the contact engagement portions 60 and the wire receiving portions 64. Retention projections 70 extend from the first edges 68 of the contact engagement portions 60 toward the first wire receiving portions 64. In the embodiment shown, the retention portions 70 are cantilevered beams having free ends 72 which extend outside of the planes of the contact engagement portions 60.

The contact engagement portions 60 of the first contacts 18 are positioned in the slots 34 of the contact receiving pockets 32. In this position, the contoured, redial or arcuate contact engagement surfaces 62 are provided in line with the openings 28. The contoured, redial or arcuate contact engagement surfaces 62 face outward toward the outer wall 26.

The contact engagement portions 60 of the first contacts 18 are retained in the slots 34 by the cooperation of the retention projections 70 with the retention openings 36 of the contact receiving pockets 32. As the contact engagement portions 60 are inserted into the slots 34, the retention portions 70 are elastically deformed by the wall of the contact receiving pockets 32 to allow the insertion to continue. With the contact engagement portions 60 fully inserted into the slots 34, the free ends 72 of the retention projections 70 are positioned in the retention openings 36, allowing the retention projections 70 to return to their unstressed position. In this position, the free ends 72 are positioned in the plane of the walls of the contact receiving pockets 32, preventing the unwanted withdrawal of the contact engagement portions 60 from the contact receiving pockets 32.

Figure 8:
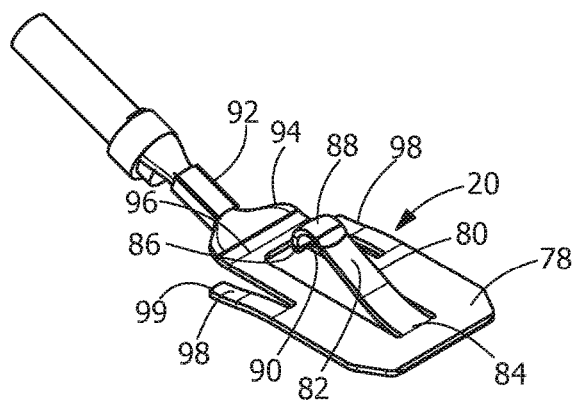
FIG. 8 is a front or contact engagement side perspective view of a contact positioned in the docking station.
Figure 9:
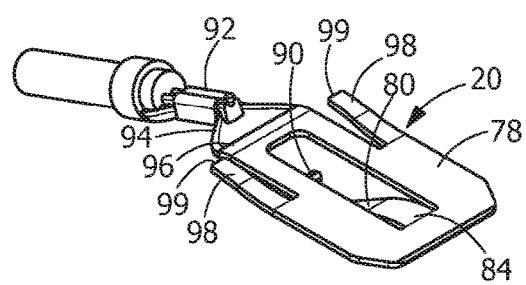
FIG. 9 is a back perspective view of the contact of FIG. 8.

As shown in FIGS. 8 and 9, the second contacts 20 have planar mounting portions 78 and contact engagement portions 80. In the illustrative embodiment shown, the contact engagement portions 80 have resilient contact arms 82 in the form of cantilevered beams. The resilient contact arms 82 have fixed ends 84 and free ends 86. Arcuate contact surfaces 88 are provided proximate the free ends 86. Overstress surfaces 90 are provided at the free ends 86. The arcuate contact surfaces 88 which extend outside of the planes of the mounting portions 78.

The second contacts 20 have wire receiving portions 92 and transition portions 94 which extend between edges 96 of the contact engagement portions 80 and the wire receiving portions 92. Retention projections 98 extend from the first edges 96 of the contact engagement portions 80 toward the first wire receiving portions 92. In the embodiment shown, the retention portions 98 are cantilevered beams having free ends 99 which extend outside of the planes of the mounting portions 78.

The mounting portions 78 of the second contacts 20 are positioned in the contact receiving slots 54. The mounting portions 78 of the second contacts 20 are retained in the contact receiving slots 54 by the cooperation of the mounting portions 78 and the retention portions 98 with the contact receiving slots 54. In this position, the arcuate contact surfaces 88 of the contact engagement portions 80 are provided in line and extend through the openings 52. The arcuate contact surfaces 88 beyond the interior wall 46 into the device receiving cavity 44.

When it is desired to charge the cordless device 12, the mating portion 24 of the cordless device 12 is moved into the device receiving cavity 44 of the mating portion 44 of the docking station 14. The configuration of the planar or linear wall portions 50 of the docking station 14 facilitate the proper positioning of the cordless device 12 in the device receiving cavity 44 of the docking station 14. As the insertion occurs, the first contacts 18 and the second contacts 20 are positioned in the same plane.

As insertion occurs, the arcuate contact surfaces 88 of the docking station 14, which extend into the device receiving cavity 44, are moved into openings 28 of the arcuate or radial outer wall 26 of the housing 22 of the cordless device 12. As this occurs, the free ends 86 and the resilient contact arms 82 of the second contacts 20 are elastically deformed inward toward the interior wall 46 of the device receiving cavity 44.

Continue insertion causes the arcuate contact surfaces 88 of the second contacts 20 to physically engage the contoured, redial or arcuate contact engagement surfaces 62 of the first contacts 18. As the resilient contact arms 82 are elastically deformed, the arcuate contact surfaces 88 exert a normal force on the contoured, redial or arcuate contact engagement surfaces 62 as mating occurs, causing the arcuate contact surfaces 88 to wipe across the contoured, redial or arcuate contact engagement surfaces 62 to remove any debris or contaminants on the contoured, redial or arcuate contact engagement surfaces 62. During insertion, the overstress surfaces 90 cooperate with the housing 40 of the docking station 14 to limit the movement of the resilient contact arms 82 to prevent the resilient contact arms 82 from taking a permanent set.

When the cordless device 12 fully inserted into the device receiving cavity 44 of the docking station 14, the arcuate contact surfaces 88 are retained in physical and electrical engagement with the contoured, redial or arcuate contact engagement surfaces 62 to allow the cordless device 12 to be charged. As the resilient contact arms 82 remain in the elastically deformed position, the arcuate contact surfaces 88 continue to exert a normal force on the contoured, redial or arcuate contact engagement surfaces 62 to ensure for a stable electrical connection between the arcuate contact surfaces 88 and the contoured, redial or arcuate contact engagement surfaces 62.

The resilient contact arms 82 of the second contacts 20 engage the contoured, redial or arcuate contact engagement surfaces 62 of the first contacts 18 when the cordless device 12 is inserted into the docking station 14. The arcuate configuration of the contact engagement surfaces 62 of the first contacts 18 provides a positive electrical connection between the first contacts 18 and the second contacts 20 and compensates for angular misalignment between the cordless device 12 and the docking station 14. Consequently, the cordless device 12 can be properly charged even if the cordless device 12 is slightly misaligned from the docket station 14.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A contact system for electrically connecting a device having an arcuate wall with a docking station having a linear wall, the contact system comprising:
   a first contact positioned in the device, the first contact comprising:
      a first contact engagement portion having a contoured contact engagement surface, the contoured contact engagement surface having a contoured contact engagement surface arc which is essentially the same as an arcuate wall arc of the arcuate wall of the device;
      a first wire receiving portion and a first transition portion extending between a first edge of the first contact engagement portion and the first wire receiving portion; and
      first retention projections extending from the first edge of the first contact engagement portion toward the first wire receiving portion;
   a second contact positioned in the docking station, the second contact comprising:
      a second contact engagement portion having a resilient contact arm;
   wherein the resilient contact arm of the second contact engages the contoured contact engagement surface of the first contact when the device is inserted into the docking station;
   wherein the engagement of the resilient contact arm of the second contact and the contoured contact engagement surface of the first contact provides a positive electrical connection between the first contact and the second contact and compensates for angular misalignment between the device with the docking station.

2. The contact system as recited in claim 1, wherein the first contact engagement portion of the first contact has a longitudinal axis which is essentially perpendicular to a longitudinal axis of the first contact.

3. The contact system as recited in claim 1, wherein the resilient contact arm of the second contact extends from a mounting portion of the second contact engagement portion of the second contact.

4. The contact system as recited in claim 3, wherein the mounting portion is a planar member.

5. The contact system as recited in claim 4, wherein the resilient contact arm is a cantilevered beam with a free end which is positioned outside of a plane of the mounting portion.

6. The contact system as recited in claim 5, wherein the second contact has a second wire receiving portion and a second transition portion which extends between a first edge of the second contact engagement portion and the second wire receiving portion.

7. The contact system as recited in claim 6, wherein second retention projections extend from the first edge of the second contact engagement portion toward the second wire receiving portion.

8. A cordless device which is charged by a docking station, the device comprising:
a housing having an arcuate outer wall;
an opening provided in the outer wall, the opening extending through the outer wall to an interior cavity of the housing;
a contact positioned in a pocket in the interior cavity of the housing, the pocket and the contact positioned in line with the opening, the contact having a contact engagement portion having an arcuate contact engagement surface, the arcuate contact engagement surface having an arcuate contact engagement surface arc which is essentially the same as an outer wall arc of the outer wall of the device;
wherein the arcuate contact engagement surface of the contact is positioned in electrical engagement with a docking contact of the docking station as the cordless device is inserted into the docking station;
wherein the configuration of the contact allows the contact to compensate for angular misalignment between the device with the docking station.

9. The cordless device as recited in claim 8, wherein the contact engagement portion of the contact has a longitudinal axis which is essentially perpendicular to a longitudinal axis of the contact.

10. The cordless device as recited in claim 9, wherein the contact has a wire receiving portion and a transition portion which extends between a first edge of the contact engagement portion and the wire receiving portion.

11. The cordless device as recited in claim 10, wherein retention projections extend from the first edge of the contact engagement portion toward the wire receiving portion.

12. The cordless device as recited in claim 11, wherein the pocket in the interior cavity of the device has retention openings which cooperate with the retention projections to retain the contact in the pocket of the device.

13. A cordless device docking system comprising:
a cordless device comprising:
a first housing having an arcuate outer wall;
a first opening provided in the outer wall, the first opening extending through the outer wall to an interior cavity of the housing;
a first contact positioned in the interior cavity of the housing in line with the first opening, the first contact having a first contact engagement portion having an arcuate contact engagement surface, the arcuate contact engagement surface having an arcuate contact engagement surface arc which is essentially the same as an outer wall arc of the outer wall of the device;
a docking station comprising:
a second housing with a device receiving cavity having a linear wall portion;
a second opening provided in the linear wall portion, the second opening extending through the linear wall portion;
a second contact positioned in line with the second opening and extending through the second opening, the second contact having a second contact engagement portion having a resilient contact arm;
wherein the resilient contact arm of the second contact engages the arcuate contact engagement surface of the first contact when the device is inserted into the docking station;
wherein the engagement of the resilient contact arm of the second contact and the arcuate contact engagement surface of the first contact provides a positive electrical connection between the first contact and the second contact and compensates for angular misalignment between the device with the docking station.

14. The cordless device docking system as recited in claim 13, wherein the first contact engagement portion of the first contact has a longitudinal axis which is essentially perpendicular to a longitudinal axis of the first contact.

15. The cordless device docking system as recited in claim 14, wherein the first contact has retention projections and the first housing has a contact receiving pocket in the interior cavity of the device, the contact receiving pocket has retention openings which cooperate with the retention projections to retain the first contact in the pocket of the device.

16. The cordless device docking system as recited in claim 13, wherein the second contact has a planar mounting portion which is positioned in a mounting slot of the second housing, the resilient contact arm is a cantilevered beam with a free end which is positioned outside of a plane of the mounting portion.

17. The cordless device docking system as recited in claim 16, wherein the cantilevered beam extends through the second opening in the linear wall portion of the docking station and through the first opening in the outer wall of the device to engage the arcuate contact engagement surface of the first contact.

18. The cordless device docking system as recited in claim 17, wherein the free end of the cantilever beam has an anti-overstress surface which prevents the cantilever beam from taking a permanent set.

\* \* \* \* \*